United States Patent
Garofalo et al.

(10) Patent No.: US 6,633,590 B1
(45) Date of Patent: Oct. 14, 2003

(54) METHOD OF SYNCHRONIZING A REFERENCE CLOCK OF A GROUND STATION AND A CLOCK OF A REMOTE SYSTEM

(75) Inventors: Giovanni Garofalo, Lisse (NL); Giovanni Busca, Neuchâtel (CH)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 09/521,851

(22) Filed: Mar. 9, 2000

(30) Foreign Application Priority Data

Mar. 11, 1999 (FR) ............................................. 99 02993

(51) Int. Cl.$^7$ ................................................. H04J 3/06
(52) U.S. Cl. ...................... 370/507; 370/503; 375/354; 375/356; 375/362
(58) Field of Search ................................. 370/321, 324, 370/330, 336, 337, 350, 395.62, 503, 507, 511, 513; 375/356, 362, 363, 364, 365, 366, 371

(56) References Cited

U.S. PATENT DOCUMENTS

| | | | | |
|---|---|---|---|---|
| 3,626,295 A | * | 12/1971 | Sabrui ........................ | 370/324 |
| 3,995,111 A | * | 11/1976 | Tsuji et al. .................. | 375/358 |
| 4,346,470 A | * | 8/1982 | Alvarez et al. ............. | 370/324 |
| 4,418,409 A | * | 11/1983 | Queen ........................ | 370/324 |
| 4,561,099 A | | 12/1985 | Atsugi et al. | |
| 4,591,730 A | * | 5/1986 | Pennoni ...................... | 370/321 |
| 4,602,375 A | * | 7/1986 | Inukai ........................ | 375/358 |
| 4,686,673 A | * | 8/1987 | Hotta .......................... | 370/324 |
| 4,703,479 A | * | 10/1987 | Ikeda .......................... | 370/324 |
| 4,792,963 A | * | 12/1988 | Campanella et al. ....... | 375/358 |
| 5,245,612 A | * | 9/1993 | Kachi et al. ................. | 370/324 |
| 6,243,372 B1 | * | 6/2001 | Petch et al. ................. | 370/350 |

OTHER PUBLICATIONS

Annoni, M. and Garofalo, G., "Access And Synchronization Schemes In the ESA OBP System," *Proceedings of the Global Telecommunications Conference (GLOBECOM)* 1991, pp. 206–211.

* cited by examiner

*Primary Examiner*—Wellington Chin
*Assistant Examiner*—Jamal A. Fox
(74) *Attorney, Agent, or Firm*—Sughrue Mion, PLLC

(57) ABSTRACT

The invention relates to a method of synchronizing a reference clock of a first ground station and a local clock of a remote system, in particular a satellite. It includes:

a) acquisition in a first loop of synchronization between reference bursts received by the remote system and generated bursts synchronized with the local clock, b) detection of the recognition word of the reference bursts received by the first remote system and generation of a time window containing N pulses of the reference clock, c) acquisition of the average phase of said pulses and comparison with the phase of the local clock, and d) in a second loop, synchronization of the phase of the local clock with said average phase.

The method can be reiterated to synchronize a second ground station with the first one via the remote system.

15 Claims, 2 Drawing Sheets

METHOD OF SYNCHRONIZING A REFERENCE CLOCK OF A GROUND STATION AND A CLOCK OF A REMOTE SYSTEM

The present invention concerns a method of synchronizing a reference clock of a ground station and a clock of a remote system, in particular a satellite, which can be less accurate than the reference clock.

BACKGROUND OF THE INVENTION

A number of problems are associated with establishing an absolute time reference.

Although there is a universal time reference, it is not available in real time. This universal time reference is referred to as "coordinated universal time" (UTC) and is generated by the co-operation of around 50 countries, each of which has an official time reference center with very accurate atomic clocks which provide their own estimate of the UTC time. Consequently, to obtain the exact value of the real UTC time, it is necessary to collect all the data and to perform a number of calculations, as a result of which the exact value of the UTC time is available at the end of a delay which is in the order of approximately one month. Thus there is no physical clock which maintains UTC time, which means that if such a clock is required in real time an approximation is needed.

The best available approximation of UTC time is GPS (Global Positioning System) time. This is kept synchronized with UTC time with an accuracy which in practice is in the order of 20 ns. However, this technique does not allow real time dissemination of GPS time, because of the selective availability of the GPS signal and because of noise on the link during communication of the GPS frequency and time. It is necessary to average the GPS signals over a period of approximately one day to acquire GPS time with the nominal accuracy, in particular for synchronizing communications networks. This requires a relatively good clock which is stable over a period of approximately one day.

Transferring time information T and frequency information F from one point to another introduces errors which limit the accuracy and stability of the recovered clock. The Navigation Satellite Broadcast (NSB) system is based on the best possible estimate of the propagation time D when transmitting data between the ground and space. A clock CK(t) transmitted at a time t is received as a clock CK(t+D) at a time t+D and any uncertainty as to the value of D is reflected in a phase error for the received clock and thus inaccuracy in respect of the time T and the frequency F.

However, most current systems operate in an open loop configuration, with no interaction or feedback between the received clock and the reference clock.

One prior art bidirectional satellite communications technique does not evaluate the delay D directly but effects a time comparison by exchanging data between the two clocks, on the assumption that the uplink and downlink delays D are equal. This concept does not use a closed loop. That technique is described in U.S. Pat. No. 4,792,963 (CAMPANELLA). It uses a phase correction which is accumulated during a sidereal day and is then applied for the next sidereal day. However, although that method provides an effective correction that prevents long-term drift, it is not suitable for correction in real time.

OBJECTS AND SUMMARY OF THE INVENTION

The present invention proposes to reduce the discrepancy between the quality of highly accurate clocks of fixed installations on the ground and the performance of methods for transmitting this precise and stable time together with frequency information.

It relates to a new method of transferring time and frequency information via satellite in real time which is based in particular on direct measurement of the delay D and which is limited only by system noise.

One object of the invention is therefore to synchronize a local clock of a remote installation, such as a satellite, with a reference clock of a ground station.

Another object of the invention is to synchronize two or more ground stations with each other by iterative use of the method.

Another object of the invention is to synchronize the local clock of another satellite when the clock of a first satellite has been synchronized with the ground station including the reference clock.

Another object of the invention is to improve the accuracy over that obtained with prior art techniques by a factor of up to two orders of magnitude.

Another object of the invention is to obtain improved accuracy in real time and in a manner which is compatible with universal coverage.

At least one of the above objects is achieved by a method of synchronizing a reference clock of a first ground station and a local clock of a first remote system, in particular a moving body and notably a satellite, the reference clock signals being contained in streams of reference pulses referred to as hereinafter as bursts (or reference salvoes) transmitted by the ground station and received by the first remote system, said bursts beginning with a recognition word, the method including:

a) acquisition in a first loop of preliminary synchronization between said reference bursts received by the first remote system and bursts generated by the first remote system and synchronized with the local clock, b) detection of the recognition word of the synchronized reference bursts received by the first remote system and generation after detection of said recognition word of a time window containing a given number N of pulses of said reference clock, c) acquisition of the average phase of said pulses received from the reference clock in the time window and comparison with the phase of the local clock, and d) in a second loop, synchronization of the phase of the local clock with said average phase to achieve said synchronization of the local clock.

The method can further include:

e) final synchronization of the reference bursts (salvoes) which are compensated by the propagation delay D of the uplink signal and said bursts generated by the remote system.

In the method, the acquisition of synchronization can entail:

a1) in the first remote system, comparing the time of reception of the recognition words of the reference bursts transmitted by the ground station and the start of the bursts generated by the first remote system, and a2) in the ground station, adjusting the transmission of the reference bursts so that said reception time coincides with said start of said generated bursts.

The method can in particular use a time-division multiple access (TDMA) multiplex uplink to transmit the reference bursts between the ground station and the moving body.

The method can also use a time-division multiplex (TDM) downlink between the first remote system and the ground station.

To synchronize a second remote system, namely a second satellite and/or a second ground station, after said synchronization of the onboard clock of the first remote system, the method can iterate said synchronization such that the reference clock is said synchronized local clock of the first remote system and the local clock to be synchronized is a local clock of a second remote system, said iteration including:

a') acquisition in a third loop of preliminary synchronization between bursts transmitted by the first remote system, which constitute reference bursts beginning with a recognition word, and bursts generated by the second remote system and synchronized with the local clock of the second remote system, b') detection of the recognition word of the bursts transmitted by the first remote system which are received by the second remote system and synchronized and generation after detection of said recognition word of a time window including a given number N' of pulses received from said synchronized local clock, c') acquisition of the average phase of said pulses received from said synchronized local clock and comparison with the phase of the local clock, and d') in a fourth loop, synchronizing the phase of said local clock of the second remote system with said average phase to synchronize the local clock of the second remote system.

The method can also include:

e') final synchronization of said reference bursts (salvoes) and said bursts generated by the second remote system.

The method can be such that:

a'1) in the second remote system, it compares the time of reception of the recognition words of the synchronized bursts transmitted by the first remote system and the start of the bursts generated by the second remote system, and a'2) in the first remote system, it adjusts the transmission of said transmitted bursts so that said time they are received by the second remote system coincides with the start of said generated bursts.

Potential applications of the method according to the invention include:

generating in space a universal time reference based on a high-performance atomic clock in a ground station, without it being necessary to install a high-performance clock on the satellite, precisely comparing time and frequency with more accurate clocks on the ground, for applications in the field of industrial calibration or requiring real time clocks (the accuracy that can be achieved can be two orders of magnitude greater than that currently available using the GPS), precisely synchronizing digital communications networks and exchanges, navigation and positioning in the vicinity of the Earth and in space, and comparing clocks on the ground a great distance apart.

BRIEF DESCRIPTION OF THE DRAWINGS

Other features and advantages of the invention will become more clearly apparent on reading the following description, which is given by way of non-limiting example and in conjunction with the accompanying drawings, in which.

MORE DETAILED DESCRIPTION

Figure 1:
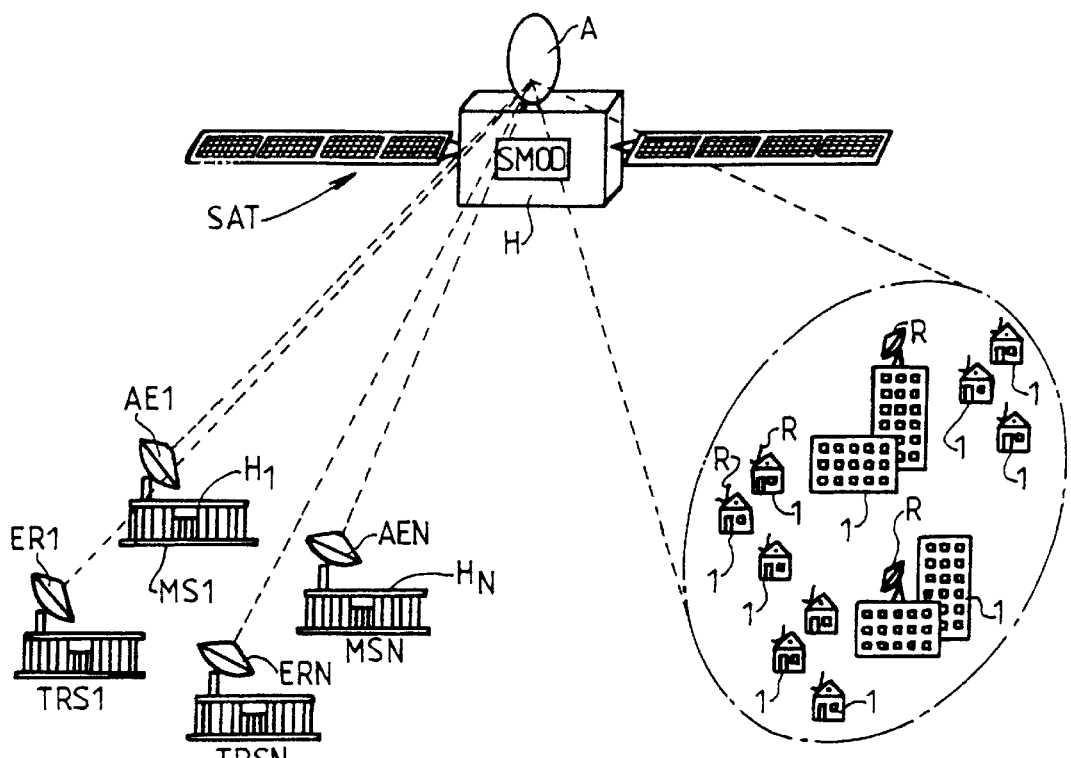
FIG. 1 is a block diagram of a system employing the method according to the invention.

Referring to FIG. 1, a system which can be used in the context of the present invention has a number of ground stations MS1 to MSN with antennas AE1 to AEN for transmitting to a satellite SAT having a transceiver antenna A and an onboard electronic module SMOD. The antenna A is capable of transmitting signals to the aforementioned antennas AE1 to AEN and also to ground stations TRS1 to TRSN with transceiver antennas ER1 to ERN and to users 1 with receiver antennas R (here "users" means either individual persons or buildings). Reference stations MS1 to MSN have reference clocks $H_1$, to $H_N$.

The method according to the invention synchronizes the local clock H of the satellite SAT with the clock $H_1$, of the ground station MS1.

The method can be used iteratively so that, when synchronization has been acquired, the clock H can in turn be used as a reference clock for synchronizing the clock $H_1$ and the reference clock of one or more other reference ground stations MS2 to MSN and/or the local clock of one or more other satellites.

Also, once synchronized, the clock H can serve as a highly accurate reference clock for other ground stations TERS1 to TERSN which are not equipped with a highly accurate clock or for disseminated users 1 equipped with receiver antennas R. In this latter case, the accuracy on the ground depends on the stability of the propagation time between the satellite and the station 1.

The concept of the present invention employs a closed loop synchronization process to enable real time synchronization of the clock H with the clock $H_1$, and possibly synchronization with each other of two or more clocks, such as the clocks $H_1$, and $H_2$, using the previously synchronized local clock H, which has thereby become a reference clock.

As explained in the remainder of the description, the propagation delay D between the ground station and the satellite is used directly so that the satellite receives the reference bursts correctly, i.e. synchronously with the bursts transmitted by the ground station.

The frequencies of the clock H and the clock $H_1$, are synchronized before the phase of the onboard local clock H is synchronized with the signal received from the reference clock $H_1$. Initially, time is measured independently on board the satellite and on the ground by means of a counter for counting bursts (streams of pulses) which have a given nominal duration, for example one millisecond. The sequence of successive bursts is identified both on board the satellite and on the ground by means of a burst counter. For each burst, the number of the burst is transmitted from the onboard burst counter to the ground station to enable the time on board the satellite to be aligned with the time on the ground to establish a common timebase.

This operation is performed by means of a first loop between the ground station and the onboard module SMOD which verifies continually (i.e. for each burst) the arrival time of the packet transmitted by the ground station relative to its instantaneous nominal position on board the satellite SAT. As a general rule, the satellite SAT does not receive a packet transmitted from the ground at its nominal position because of uncertainty as to the phase of the clock, its frequency drift and the position of the satellite, and therefore the estimated propagation delay D.

After a few iteration loops, the ground station is able to adjust the position at which the packets are transmitted so that the packets are received on board the satellite at their nominal position. This is achieved by changing the time at which the packets are transmitted by shifting them by one or more periods of the reference clock.

Note that such time shifting could be done on the satellite, but it is more practical to perform this function in a ground station, rather than in an onboard system.

The packet arrival information for each burst is received on the ground on an available channel of the transmission system and is continually updated by the module SMOD. The information is used to determine the time shift by which the transmission of the packets must be offset to obtain the nominal reception position on board the satellite SAT.

Once the nominal position has been achieved, the loop remains permanently active and thus provides a permanent timebase common to the ground station and the satellite. If the loop fails, the frequency synchronization starting process must recommence from the beginning.

Figure 2:
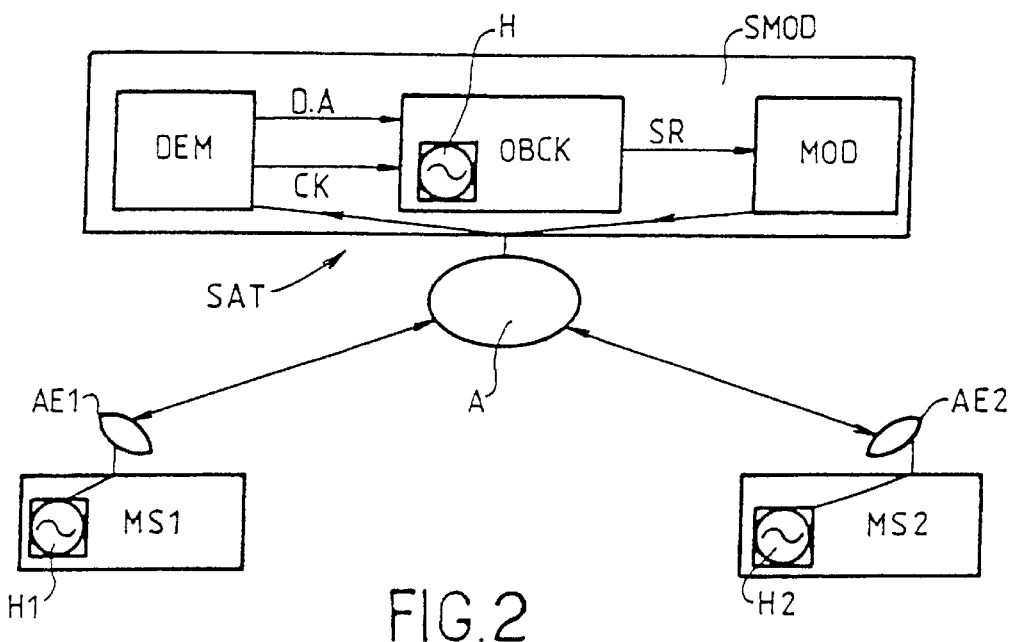
FIG. 2 shows the interactive synchronization of two ground stations by means of a satellite.

FIG. 2 shows that TDMA signals received by the antenna A are demodulated by a demodulator module DEM which generates a data signal DA and a clock signal CK. These signals are transmitted to a processor OBCK which has a local clock H and which in turn generates return signals SR which are sent to a modulator MOD for transmission on the downlink via the antenna A. The function of this operation, which enables coarse synchronization of the bursts with a maximum time error equal to half a clock period, is to enable fine synchronization of the phase of the onboard clock with the signal from the clock on the ground as received by the satellite.

Figure 3:
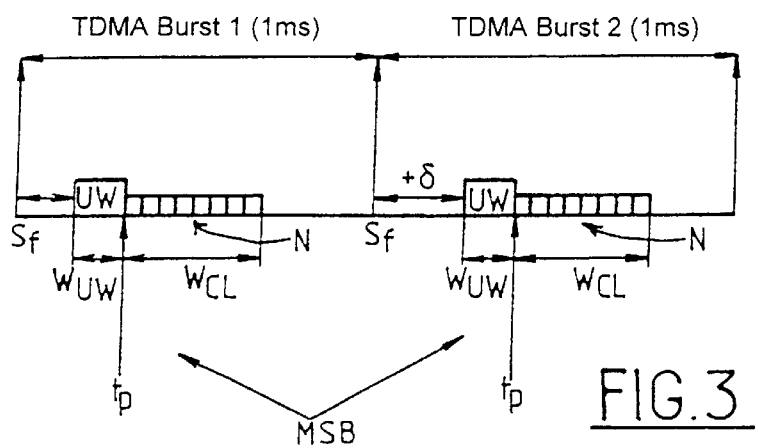
FIG. 3 is a diagram showing the synchronization method of the invention.

Synchronizing the phase of the onboard clock H with the clock $H_1$ on the ground will now be described with reference to FIG. 3.

The method uses a filter of the processor OBCK which is capable of tolerating the initial frequency difference between the clock H and the clock $H_1$. The packets MSB transmitted by the station MS1 include a recognition word UW which is detected in a window $W_{UW}$ which is followed by a detection window $W_{CL}$ whose width is equal to an integer number of pulses.

Because this comparison of the phases of the clock $H_1$ on the ground and the onboard clock H begins at time $t_p$, with the first symbol which follows detection of the recognition word UW, and is performed inside the window $W_{CL}$ whose duration is a given number N of clock pulses, the estimate of the phase of the clock $H_1$ on the ground is not disrupted by variations in the propagation time D outside this short window.

The advantage of this concept is that any variation of the propagation delay D, which has a bandwidth much smaller than the reciprocal of the burst repetition time, will therefore have a negligible influence on the time $t_p$ at which the estimation of the phase of the clock begins. This eliminates the effect of propagation variations in the ionosphere and the troposphere.

The estimation process entails averaging the phase associated with the clock $H_1$ on the ground over a number N of clock cycles received during the window $W_{CL}$.

The resulting phase estimate is used in a closed loop to adjust the phase of the oscillator of the onboard clock H to keep it synchronized with the phase of the clock on the ground as received by the satellite.

The propagation delay D of the uplink signal is evaluated by having the ground station measure the time to transmit the uplink signal and the time to receive the downlink signal, which is generated by the onboard phaselocked clock. It is then possible to offset transmission of the reference bursts (salvoes) to the ground station exactly by the propagation delay D and thereby to reproduce on board the satellite bursts exactly synchronized with the bursts from the ground station. During this operation, the bursts generally remain synchronized to within half a clock period. Otherwise, preliminary synchronization is again required.

The preferred transmission modes are TDMA mode for the uplink direction and TDM mode for the downlink direction.

The uplink bit rate is related to the time accuracy that can be achieved, although the process as such is independent of frequency, i.e. is limited only by the existing level of phase control technology both in the ground station and in the onboard module. Experiments have been conducted in which phase variations less than 1° were measured for a ground station having a caesium reference clock with a stability of $10^{-11}$ and an onboard module having a quartz crystal oscillator with a stability of $10^{-6}$.

The onboard module had a digital phase-locked loop and the clock frequency was 32.768 MHZ.

It is estimated that it is possible to obtain a peak-to-peak phase difference in the order of 0.1° between the clock on the ground and the onboard clock.

FIG. 2 shows that synchronization relies on a phase-locked loop which incorporates a TDMA demodulator DEM, a TDM modulator MOD and a module OBCK which includes a phase comparator for each incoming clock, a low-pass filter and a clock H consisting of a voltage-controlled oscillator VCXO.

The clocks on the ground can initially be considered as reference clocks, given that they are accurate, but are not synchronized with each other.

One object of the present invention is to synchronize them with each other, which can be achieved in the manner described hereinafter.

Initially, the clock signal CK demodulated by the demodulator DEM is used to synchronize the phase of the clock H by the procedure described above. The clock H can then be used as a reference clock. Synchronizing a clock of relatively lower stability to a clock of relatively higher stability confers on the first clock the same performance as the relatively higher stability clock for as long as the synchronization is maintained.

One specific feature of the method according to the invention is that the clock signal CK corresponding to the ground station and demodulated by the demodulator DEM is used in triggered mode, i.e. is not used continuously. A given number N of clock cycles for each TDMA burst is used to estimate the phase. These N clock pulses are contained in the window $W_{CL}$, which follows on immediately from the window UW and is independent of variations in the arrival time of the packets, which influences only the position of the recognition word UW in the burst and has no influence on the content of the window, since the window always contains an integer number N of clock pulses. This feature is essential for the phase estimate to be correct. The average phase associated with N clock pulses contained in the window $W_{CL}$ is compared with the phase of the onboard oscillator and the phase-locked loop processes any difference between the two to lock the phase.

The method includes the following phases:

1) Acquisition Phase

In this initial phase, the onboard clock H very probably has a slight frequency difference relative to the clock $H_1$ on the ground, but the most serious problem is uncertainty as to the actual position of the satellite, which must be compensated to establish a common timebase in space and on the ground. An appropriate pass-band must be used for this acquisition phase, which has already been described, and this is why the device OBCK includes a low-pass filter. The information sent to the ground station MS1 is used to produce preliminary package transmission time corrections. The final correction is effected after measuring the round trip time and evaluating the delay D of the uplink signal.

2) Synchronization Chase

In this phase the phase-locked loop on board the satellite is in tracking mode and a much narrower PLL filter bandwidth is used. This enables very accurate phase synchronization between the onboard clock and the clock on the ground to be acquired and maintained.

The frequency of the clock $H_1$ must not change during uplink transmission, of course. This is achieved by compensating the Doppler effect using round trip times measured during each burst so that a signal compensated for the Doppler effect is available on board the satellite SAT. After this synchronization phase, the onboard clock H and the clock $H_1$ on the ground are fully synchronized, for example to an accuracy of 1° or better. The clock H can then be used as a reference clock, with the same characteristics and the same performance as the clock $H_1$ on the ground, for as long as the phase-locked loop continues to be effective.

3) Synchronizing at Least Two Remote Terrestrial Clocks by Means of the Onboard Clock H It is then possible for other stations MS2, etc. which have the same clock characteristics as the first station MS1 to communicate with the satellite SAT and, by repeating the above phases 1 and 2, to be fully synchronized with the first station MS1, with a phase error which can be 1° or better, for example. This provides a reference frequency and a reference time at remote stations whose clocks $H_2$, etc. are intrinsically reference clocks but are not co-ordinated with each other. If the clocks are fully synchronized, the absolute time information can easily be extracted and then compared between the remote stations. This phase can be used with benefit to synchronize the local clock of other satellites with the clock H.

The satellite SAT is linked to a plurality of accurate and reliable clocks and so any of these clocks can be used to improve the reliability of the system. The module SMOD can in fact switch from one source to another and change reference clock if the clock previously used becomes unavailable.

4) Clock Dissemination Phase

Because an accurate and stable reference clock H is available on board the satellite SAT, without it being necessary for an atomic clock to be physically present on the spacecraft, the clock can be used by a large number of users, for example for frequency calibration, for telecommunications networks or for the users of mobile telephones. In particular, this can be achieved by means of a geostationary satellite SAT. A greater number of applications could be covered by constellations of geostationary or non-geostationary satellites.

Figure 4:
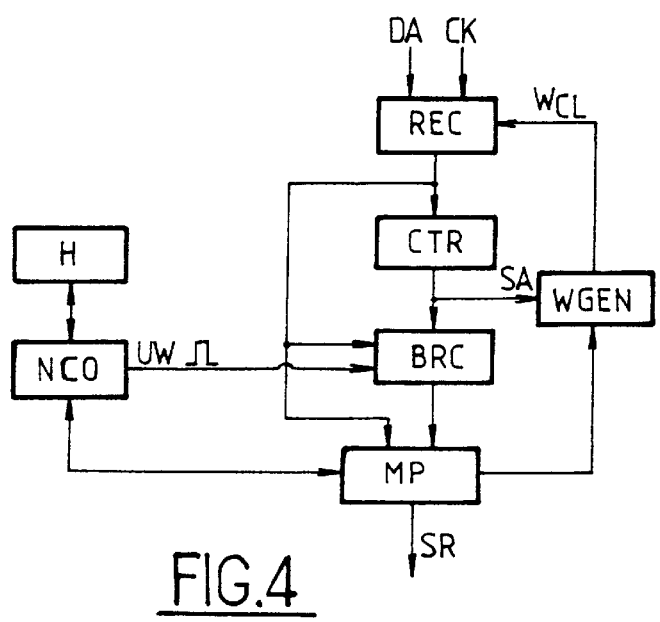
FIG. 4 is a block diagram of a system for implementing the method according to the invention.

In FIG. 4, the module OBCK has an input circuit REC which receives demodulated signals DA and CK from the clock $H_1$ and which feeds a microprocessor MP and a burst counter CTR. The burst counter supplies the recognition word to a burst reception circuit BRC which compares the time at which it receives the word UW originating in the bursts which are transmitted from the ground and contain the pulses of the clock $H_1$ and the word UW corresponding to bursts generated locally by the loop NCO synchronizing the local clock H.

The result of this comparison is supplied to the microprocessor MP so that it can generate and transmit to the ground station return signals SR for varying the time at which the bursts are transmitted. The burst counter CTR also generates an authorization signal SA for a window generator WGEN which is controlled by the microprocessor MP and generates a signal corresponding to the window $W_{CL}$ which is received by the receiver circuit REC. The circuit REC feeds the microprocessor MP with the clock signals $H_1$ contained in the window $W_{CL}$ in order for it to carry out the phase comparison and to control the phase-locked loop NCO.

What is claimed is:

1. A method of synchronizing a reference clock of a first ground station and local clock of a first remote system, in particular a moving body and notably a satellite, the reference clock signals being contained in reference bursts transmitted by the ground station and received by the first remote system, said bursts beginning with a recognition word, the method including:
   a) acquisition in a first loop of preliminary synchronization between said reference bursts received by the first remote system and bursts generated by the first remote system and synchronized with the local clock,
   b) detection of the recognition word of the temporally synchronized reference bursts received by the first remote system and generation after detection of said recognition word of a time window containing a given number N of pulses of said reference clock,
   c) acquisition of the average phase of said pulses received from the reference clock in the time window and comparison with the phase of the local clock, and
   d) in a second loop, synchronization of the phase of the local clock with said average phase to achieve said synchronization of the local clock.

2. A method according to claim 1, including:
   e) final synchronization of the reference bursts and said bursts generated by the remote system.

3. A method according to claim 1, wherein the acquisition of synchronization entails:
   a1) in the first remote system, comparing the time of reception of the recognition words of the reference bursts transmitted by the ground station and the start of said bursts generated by the first remote system, and
   a2) in the first ground station, adjusting the transmission of the reference bursts so that said reception time coincides with said start of said generated bursts.

4. A method according to claim 1, using a time-division multiple access multiplex uplink to transmit reference bursts between the first ground station and the first remote system.

5. A method according to claim 4, using a time-division multiplex downlink between the first remote system and the first ground station.

6. A method according to claim 1, wherein, after said synchronization of the local clock of the first remote system, the method iterates said synchronization such that the reference clock is said synchronized local clock of the first remote system and the local clock to be synchronized is a local clock of a second remote system, said iteration including:

a') acquisition in a third loop of synchronization between bursts transmitted by the first remote system, which constitute reference bursts beginning with a recognition word, and bursts generated by the second remote system and synchronized with the local clock of the second remote system, b') detection of the recognition word of the bursts transmitted by the first remote system which are received by the second remote system and synchronized and generation after detection of said recognition word of a time window including a given number N' of pulses received from said synchronized local clock of the first remote system, c') acquisition of the average phase of said pulses received from said synchronized local clock and comparison with the phase of the local clock of the second remote system, and d') in a fourth loop, synchronizing the phase of said local clock of the second remote system with said average phase to synchronize the local clock of the second remote system.

7. A method according to claim 6, including:

e') final synchronization of said reference bursts and said bursts generated by the second remote system.

8. A method according to claim 6, wherein N'=N.

9. A method according to claim 6, wherein:

a'1) in the second remote system, it compares the time of reception of the recognition words of the synchronized bursts transmitted by the first remote system and the start of the bursts generated by the second remote system, and a'2) in the first remote system, it adjusts the transmission of said transmitted bursts so that said time they are received by the second remote system coincides with the start of said bursts generated by the second remote system.

10. A method according to claim 6, wherein the second remote system is a second ground station having a reference clock synchronized with that of the first ground station.

11. A method according to claim 1, wherein the local clock of the first remote system is intrinsically less accurate than the reference clock of the first ground station.

12. A method according to claim 6, wherein said second remote system is a second satellite.

13. A method according to claim 7, wherein said second remote system is a second satellite.

14. A method according to claim 8, wherein said second remote system is a second satellite.

15. A method according to claim 9, wherein said second remote system is a second satellite.

* * * * *